United States Patent Office 3,547,944
Patented Dec. 15, 1970

3,547,944
COLOUR PHOTOGRAPHY UTILIZING COLOUR COUPLERS WHICH YIELD QUINONE IMINE OR AZAMETHINE DYE IMAGES
Brian Anderson, Rose Hill, Marple, England, assignor to Ilford Limited, Ilford, Essex, England, a British company
No Drawing. Continuation-in-part of application Ser. No. 432,898, Feb. 15, 1965. This application Mar. 31, 1967, Ser. No. 630,784
Claims priority, application Great Britain, Feb. 20, 1964, 7,180/64
Int. Cl. C07d 49/16
U.S. Cl. 260—310    1 Claim

ABSTRACT OF THE DISCLOSURE

New colour couplers of the Formula I:

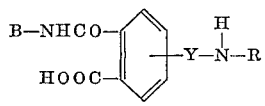

wherein X is selected from the class consisting of hydrogen and lower alkyl, Y is selected from the class consisting of the linkages —OC—, —CONH— and —COCH$_2$— when X is hydrogen and Y is —O$_2$S— when X is lower alkyl, B is the residue of a compound BNH$_2$ which will react with the oxidation products of N,N-diethyl p phenylene diamine, formed during the development with a silver salt image with that compound, to yield a dyestuff image selected from the class consisting of quinone imine and azamethine dyes and R is a substituent comprising an alkyl group containing at least 12 carbon atoms and corresponding cyclised compounds of the Formula II.

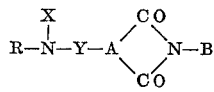

wherein R, X, Y and B have the meanings just assigned are described, together with their method of production and their use in colour photography.

---

This application is a continuation-in-part of application Ser. No. 432,898, filed Feb. 15, 1965, now U.S. Pat. 3,383,214.

This invention relates to colour couplers and to their production and use in colour photography.

Many modern processes of colour photography are based on the development of a developable silver salt photographic image by means of an aromatic primary amino compound, such as an N,N-diethyl p-phenylene diamine or a derivative thereof in the presence of a so-called colour coupler, this being a compound which will couple with the oxidation products of the developer to yield a dye image, usually an azamethine or quinone-imine dye image, in situ with the developed silver.

Where, as in many of the processes, the colour coupler is incorporated in the photographic emulsion layer in which the image is ultimately to be formed, it is important that it should be nondiffusing in such layer, i.e. that it should neither diffuse away during the processing steps nor migrate from its layer to any adjacent layer. Many attempts have been made to achieve this characteristic of non-diffusibility, i.e. to make the colour coupler substantive to the medium, usually gelatin, of the photographic emulsion. The methods which have been employed consist generally in the use of colour couplers containing groups of substantial molecular size, e.g. long chain alkyl groups, and also solubilising groups. Such colour couplers are often manufactured by a synthesis which involves several stages and the colour couplers are usually difficult to isolate and purify. It is one object of the present invention to provide a new class of colour couplers which are non-diffusing in photographic emulsion layers, and which may be manufactured by a simple synthetic process in which a solubilising group and a group conferring non-diffusion are introduced simultaneously and usually in the final stage of the synthesis. Also the solubilising group in the new couplers may be a protected form which often facilitates the isolation and purification of the colour couplers. The solubilising groups are readily freed when the compounds are dissolved in alkali prior to the addition to the photographic emulsion, or, if the colour couplers are applied as a dispersion, in the alkaline developing bath.

According to a first feature of the present invention there is provided, as a new class of colour couplers, compounds of the Formula I:

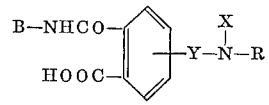

and the corresponding cyclised compounds of the Formula II:

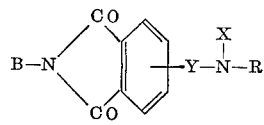

where B is a colour coupler residue, X is a hydrogen atom or a lower alkyl group, Y is —OC—, —CONH— or —COCH$_2$— when X is a hydrogen atom and Y is —O$_2$S— when X is a lower alkyl group and R is an alkyl group of 12 or more carbon atoms or a group containing same.

Particularly useful compounds according to the present invention are obtained when X is selected from a hydrogen atom and a methyl group, Y is a linkage selected from —OC— and —O$_2$S—, R is selected from dodecylphenyl and octadecyl and B is a colour coupling residue.

By the term "colour coupling residue" used to define the symbol B is meant a grouping such that the compound B–H (and therefore also the compound B.NH$_2$) is a compound which will react with the oxidation products of N.N-diethyl-p-phenylene diamine, formed during the development of a silver salt image with that compound, to yield a quione-imine or azimethine dyestuff.

According to a further feature of the invention, colour couplers of the general Formula I are obtained by condensing a compound of Formula III:

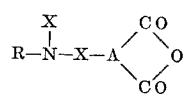

wherein R, X and Y have the meanings assigned to them above, with a compound B.NH$_2$ where B has the meaning assigned to it above, at a temperature below 100° C., for example in boiling ethyl acetate. If the condensation is carried out at a higher temperature and preferably in a solvent such as acetic acid at the boil, then colour couplers of Formula II are obtained.

According to another feature of the invention, compounds of Formula II are obtained by heating compounds of Formula I in a solvent at a temperature greater than 100° C. and preferably in glacial acetic acid at the boil.

According to another feature of the invention, compounds of Formula I are obtained from compounds of Formula II by treating with alkali, in a solvent such as a lower alcohol, for example n-propanol, followed by acidification.

The colour couplers containing an amino group i.e. compounds B.NH₂, which may be used in the process of the invention are for example:

(1) Those which contain a —COCH₂CO— group, for example benzoyl - 4-amino-2-methoxyacetanilide, 4′-methoxybenzoylacet-4-amino-2-methoxyanilide the 2-alkoxy-benzoylacet-amino-anilides described in British patent specification No. 595,313 or the aminobenzoylact-methoxy-anilides of British patent specification No. 800,108, and which give yellow dyestuffs on colour development with substituted p-phenylene diamines.

(2) Those which contain a cyanacetyl group or a pyrazolone ring for example 4-ω-cyanacetylaniline, 1-methyl-3-amino-5-pyrazolone, 1-(β-hydroxyethyl)-3-amino-5-pyrazolone, 1-phenyl-3-amino-5-pyrazolone and substituted 1-aryl-3-amino-5-pyrazolones as described in British patent specification Nos. 547,064; 680,474; 680,488, the 1-heterocyclo-3-amino-5-pyrazolones as described in British patent specification No. 599,919, the 1-(aminoaryl)-3-coumarilylamino-5-pyrazolones of British patent specification No. 890,305, the 1-alkyl-3-(aminophenoxyacetamido)-5 - pyrazolones of British patent specification No. 865,720 or the 1-phenyl 3-amino-arylamino-5-pyrazolones described in British patent specification Nos. 968,461 and 956,261, and which give magenta dyestuffs on colour development with substituted p-phenylene diamines.

(3) Phenols and 1-naphthols, which contain an amino group, for example 4-chloro-5-methyl-2-aminophenol or the aminophenols described in British patent specification Nos. 797,141; 754,306 1-amino-5-naphthol, N(β-aminoethyl)-1-hydroxy-2-naphthamide or similar N-substituted naphthamides containing an amino group, as described in British patent specification No. 902,266 which may also be substituted in the 4-position, as described in British patent specification No. 757,368 and which give cyan dyestuffs on colour development with substituted p-phenylene diamines.

It is a preferred feature of the invention to include the new colour couplers of the invention in a light-sensitive gelatino- or gelatino-substitute silver halide emulsion layer which forms part of a multilayer film or paper of the kind used for colour photography.

According to a further feature of the present invention, therefore, there are provided photographic light sensitive colloid silver halide emulsions, which comprise a colour coupler of general formulae I or II.

According to a still further feature of the invention there is provided a photographic material for use in colour photography which comprises a support carrying a plurality of photographic light sensitive colloid silver halide emulsion layers, selectively sensitive to different regions of the spectrum and comprising in a said emulsion layer or in a layer adjacent thereto, a colour coupler of the general Formulae I or II.

In the foregoing forms of the invention the colloid will generally be gelatin or may be another colloid medium, e.g. polyvinyl alcohol.

The multilayer colour photographic material may be a natural order material in which the images are to be formed in colours complementary to those of the orignal object or one in which an unnatural order is used, for example one in which in the top layer there is formed a yellow image of the blue parts of the object, in one of the two lower layers there is formed a cyan image of the green parts of the object and in the other magenta image of the red parts of the object.

The new colour couplers may be incorporated in the photographic emulsion layers by taking them up in dilute alkali, e.g. dilute sodium hydroxide and adding the resulting solution to the emulsion. If the colour couplers are of Formula II the alkali has the effect of opening the ring structure:

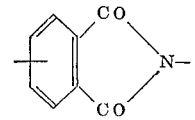

to afford a free carboxylic group.

Alternatively, the compounds may be dispersed, for example in a non-solvent medium, and the dispersion added to the photographic emulsion.

Although it is known to those skilled in the art that magenta dyestuffs with absorption bands having absorption maxima within the range 535–555 mμ are, in conjunction with suitable yellow and cyan dyes, capable of good colour reproduction, this is only one of the many properties which render colour couplers, from which such dyes are derived, suitable for use in a subtractive multilayer colour film assembly.

Other properties which are of equal importance are, for instance (a) solubility in the phase in which they are incorporated.
(b) substantivity to the layer in which they are incorporated.
(c) interaction with the colloid, e.g. gelatin which may lead to viscosity rise, to phase separation etc.
(d) effect on silver halide surface, e.g. interference with chemical and/or spectral sensitisation.
(e) effect on storage behaviour of emulsions at normal and elevated temperatures.
(f) coupling activity.
(g) stability of the resultant dye.
(h) stain from residual colour coupler.

It is very difficult to find compounds which meet all these and more requirements but the compounds of the present invention meet most of those requirements and in particular the compound of Example 22 (later herein) shows excellent performance in all these respects.

The following examples will serve to illustrate the invention.

EXAMPLE 1

4-(4-dodecylphenylaminocarbonyl)-N-(1-phenyl-5-pyrazolonyl-3-)phthalimide

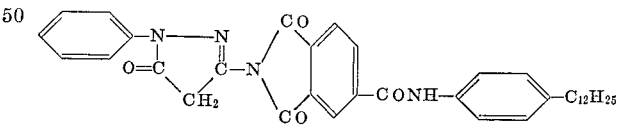

A mixture of 5.25 parts of 1-phenyl-3-amino-5-pyrazolone, 13,05 parts of 4-(4-dodecylphenylaminocarbonyl) phthalic anhydride and 200 parts of glacial acetic acid is heated under reflux for 1 hour. The reaction product which crystallises out on cooling is filtered off and washed well with ethyl acetate. The 8.4 parts of 4-(4-dodecylphenylaminocarbonyl - N - (1 - phenyl - 5 - pyrazolonyl - 3 - ) phthalimide are obtained as a fawn coloured solid melting at 222–225° C. On analysis the compound is found to contain 73.5% of carbon, 6.7% of hydrogen and 9.2% of nitrogen ($C_{36}H_{40}N_4O_4$ requires 73.0% of carbon, 6.8% of hydrogen and 9.5% of nitrogen).

The 4-(4-dodecylphenylaminocarbonyl)phthalic anhydride used in the above example may be prepared as follows:

A mixture of 50 parts of 4-(4-dodecylphenylaminocarbonyl)phthalic acid and 500 parts of thionyl chloride is heated together under reflux for 2 hours. The yellow crystalline precipitate obtained on cooling is filtered off and recrystallised from 1800 parts of ethyl acetate. The 31 parts of 4-(4-dodecylphenylaminocarbonyl)phthalic anhydride are obtained as a yellow crystalline solid meting at 195–196° C. On analysis the compound is found to contain 74.1% of carbon, 6.8% of hydrogen and 3.3% of nitrogen ($C_{27}H_{33}NO_4$ requires 74.5% of carbon, 7.6% of hydrogen and 3.2% of nitrogen).

The 4-(4-dodecylphenylaminocarbonyl)phthalic acid itself may be prepared as follows:

A mixture of 75 parts of 4-(4-dodecylphenylaminocarbonyl)phthalimide, 250 parts of water, 19.3 parts of potassium hydroxide pellets and 200 parts of ethanol is refluxed for 5 hours. Carbon D.Y.3 added and the mixture filtered hot. After adding a further 500 parts of water, the filtrates are acidified with concentrated hydrochloric acid to obtain a white precipitate. The product is collected by filtration washed with water and recrystallised from 1500 parts of glacial acetic acid. 64 parts of a white solid are obtained melting at 190–192° C. On analysis the compound is found to contain 71.1% of carbon, 7.6% of hydrogen and 3.3% of nitrogen ($C_{27}H_{35}NO_5$ requires 71.5% of carbon, 7.7% of hydrogen and 3.1% of nitrogen).

The 4-(4-dodecylphenylaminocarbonyl)phthalimide may be prepared as follows:

A mixture of 60 parts of p-dodecylaniline, 48 parts of phthalimide 4-carboxy chloride and 500 parts of dioxan is refluxed for 4 hours. The yellow reaction product which crystallises out on cooling is filtered off and recrystallised from 750 parts of dimethylformamide. The 75.0 parts of 4-(4-dodecylphenylaminocarbonyl)phthalimide are obtained as yellow coloured solid melting at 304–306° C. On anaysis the compound is found to contain 74.8% of carbon, 7.7% of hydrogen and 6.2% of nitrogen. ($C_{27}H_{34}N_2O_3$ requires 74.7% of carbon, 7.8% of hydrogen and 6.4% of nitrogen.)

The phthalimide-4-carboxy chloride itself may be obtained from trimellitic anhydride by reacting first with ammonia and then with thionyl chloride.

A photographic layer containing the colour coupler may be obtained in the following manner:

A mixture of 1.41 parts of the colour coupler, 20 parts of n propanol and 2.4 parts of 2 N potassium hydroxide solution is warmed to dissolve and distilled water added to make 30 parts. The solution of colour coupler so obtained is added to 500 parts of a green sensitised gelatin silver halide emulsion containing silver halide equivalent to 2.5 parts of silver and 3.5% gelatin. The emulsion is then coated on a paper base and the coated layer dried. The photographic layer so obtained is exposed to green light, developed in a colour developer containing 4-amino-N-ethyl-N-ε-hydroxypentylaniline bleached and fixed, a magenta image is obtained which has an absorption maximum at a wavelength of light of 536 mμ.

EXAMPLE 2

2 - carboxy - 4 - (4 - dodecylphenylaminocarbonyl) - N - [3 - (4 - methoxybenzoylacetamido) - 4 - methoxyphenyl]benzamide

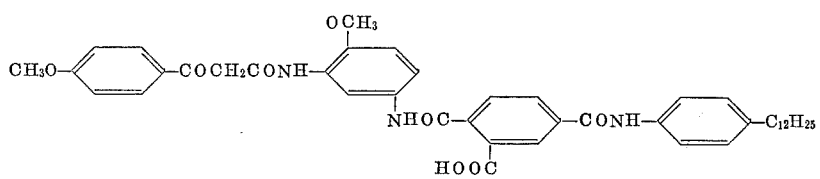

A mixture of 9.42 parts of 4-methoxy-3-(4-methoxybenzoylacetamide)aniline, 13.05 parts of 4-(4-dodecylphenylaminocarboxyl)phthalic anhydride and 240 parts of ethyl acetate is refluxed together for 1 hour. The reaction product obtained on cooling is filtered off and recrystallised from 2000 parts of methanol. The 12.4 parts of 2-carboxy-4-(4 - dodecylphenylaminocarbonyl)-N-[3-(4- methoxybenzoylacetamide) - 4 - methoxyphenyl]benzamide are obtained as colourless solid melting at 216–218° C. On analysis the compound is found to contain 68.3% of carbon, 6.4% of hydrogen and 5.6% of nitrogen ($C_{44}H_{51}N_3O_8lCH_3OH$ requires 69.0% of carbon, 6.9% of hydrogen and 5.4% of nitrogen).

EXAMPLE 3

4-(4-dodecylphenylaminocarbonyl)-N-[β(1-hydroxy-2-naphthamide)ethyl]phthalimide

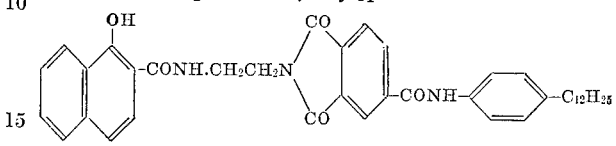

A mixture of 6.9 parts of N-(β-aminoethyl)-1-hydroxy-2-naphthamide, 13.05 parts of 4-(4-dodecylphenylamine carbonyl)phthalic anhydride, 240 parts of ethyl acetate and 15 mls. of glacial acetic acid is refluxed together for 1 hour. The solid reaction product obtained on cooling is filtered off, heated under reflux with 900 parts of acetic acid, cooled and collected by filtration. 10.0 parts of 4-(4-dodecylphenylaminocarbonyl) - N - [β(1 - hydroxy - 2 - naphthamido)ethyl]phthalimide are obtained melting at 274–275° C. On analysis the compound is found to contain 74.4% of carbon, 7.0% of hydrogen and 6.7% of nitrogen ($C_{40}H_{45}N_3O_5$ requires 74.4% of carbon, 7.0% of hydrogen and 6.5% of nitrogen).

A photographic layer containing the colour coupler may be obtained in the following manner:

A mixture of 2.4 parts of the colour coupler, 16 parts of n-propyl alcohol and 3.6 parts of 2 N potassium hydroxide solution is heated to the boil to dissolve and then diluted to 40 parts with distilled water. The solution so obtained is added to 500 parts of a red sensitised gelatine silver halide emulsion containing silver halide equivalent to 2.0 parts of silver and 3.5% gelatin. The emulsion is then coated on a paper base and the coated layer dried. When the photographic layer so obtained is exposed to red light, developed in a colour developer containing 4-amino - N - ethyl-N-ε-hydroxypentylaniline, bleached and fixed, a cyan image is obtained which has an absorption maximum at a wevelength of light of 670 mμ.

EXAMPLE 4

4-(n-octadecylaminocarbonyl)-N-(1-phenyl-5-pyrazolonyl-3-)phthalimide

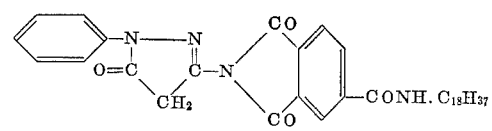

A mixture of 5.25 parts of 1-phenyl-3-amino-5-pyrazolene, 13.25 parts of 4-(n-octadecylaminocarbonyl)phthalic anhydride and 250 parts of glacial acetic acid is heated under reflux for 2 hours. The reaction product which crystallises out on cooling, is filtered off and recrystallised from 200 ml. of glacial acetic acid. The 10.4 parts of 4-(n-octadecylaminocarbonyl)-N-(1 - phenyl-5-pyrazolonyl-3-)phthalimide are obtained as a light brown solid melting at 176–180° C. On analysis the compound is found to contain 71.6% of carbon, 7.8% of hydrogen and 9.2% of nitrogen ($C_{36}H_{48}N_4O_4$ requires 72.0% of carbon, 8.0% of hydrogen and 9.3% of nitrogen).

The 4-(n - octadecylaminocarbonyl)phthalic anhydride used in the above example may be prepared as follows:

A mixture of 50 parts of 4-(n-octadecylaminocarbonyl) phthalic acid and 500 parts of acetyl chloride is heated under reflux for ½ hour. The colourless crystals which separate on cooling are collected by filtration and recrystallised from benzene. The 25 parts of 4-(n-octadecylaminocarbonyl)phthalic anhydride are obtained as a colourless crystalline solid melting at 122–123° C. On analysis the compound is found to contain 72.3% of carbon, 9.1% of hydrogen and 3.1% of nitrogen ($C_{27}H_{41}NO_4$ requires 73.2% of carbon, 9.2% of hydrogen and 3.1% of nitrogen).

The 4-(n-octadecylaminocarbonyl)phthlic acid itself may be prepared as follows:

A mixture of 51 parts of 4-(n-octadecylaminocarbonyl) phthalimide, 125 parts of 2 N sodium hydroxide solution, 750 parts of water and 500 parts of ethanol is heated under reflux for 3 hours. The solution obtained is after cooling acidified with 210 parts of 2 N hydrochloric acid and the colourless solid precipitated, is collected by filtration and recrystallised from 300 parts of glacial acetic acid. The 53.2 parts of 4-(n-octadecylaminocarbonyl) phthalic acid are obtained as a colourless solid melting at 125–127° C.

The 4 - (n-octadocylaminocarbonyl)phthalimide used above is prepared as follows:

A mixture of 50.3 parts of phthalimide-4-carboxy chloride, 39.2 parts of n-octadecylamine and 1,000 parts of dioxan is stirred under reflux for 3 hours. The solution is cooled and the precipitated solid collected by filtration. After drying the solid is heated with 700 ml. of benzene and the suspension filtered hot, the residue is then crystallised from dimethylformamide. The 51.5 parts of 4-(n-octadecylaminocarbonyl)phthalimide are obtained as a solid melting at 228–231° C. On analysis the compound is found to contain 73.0% of carbon, 9.0% of hydrogen and 6.2% of nitrogen ($C_{27}H_{42}NO_3$ requires 73.3% of carbon, 9.5% of hydrogen and 6.3% of nitrogen).

A photographic layer which contains 1.43 parts of the above colour coupler, formulated by the method of Example 1 gives a magenta dye image with light absorption maximum at 531 millimicrons.

EXAMPLE 5

4-(n-octadecylaminocarbonyl)-N-[β(1-hydroxy-2-naphthamido)ethyl]phthalimide

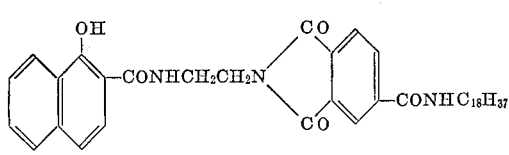

A mixture of 3.45 parts of N-(β-aminoethyl)-1-hydroxy-2-naphthamide, 6.64 parts of 4-(n-octadecylaminocarbonyl)phthalic anhydride and 150 parts of glacial acetic acid is heated under reflux for 1½ hours. The solid reaction product obtained is collected by filtration and recrystallised from dimethyl formamide. The 8.6 parts of 4 - (n-octadecylaminocarbonyl) - N - [β(1 - hydroxy - 2-naphthamido)ethyl]phthalimide are obtained as a solid melting at 257–258° C. On analysis the compound is found to contain 72.6% of carbon, 8.1% of hydrogen and 6.4% of nitrogen ($C_{40}H_{53}N_3O_5$ requires 73.3% of carbon, 8.1% of hydrogen and 6.4% of nitrogen).

A photographic layer which contains 2.36 parts of the above colour coupler, formulated by the method of Example 3 gives a cyan dye image with light absorption maximum at 670 millimicrons.

EXAMPLE 6

4-(n-octadecylaminocarbonyl)-N-[3-(4-methoxybenzoylacetamido)-4-methoxyphenyl]phthalimide

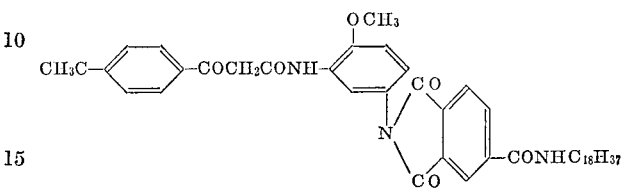

A mixture of 7.85 parts of 4-methoxy-3-(4-methoxybenzoylacetamido)aniline, 11.05 parts of 4-(n-octadecylaminocarbonyl)phthalic anhydride and 250 parts of glacial acetic acid is heated under reflux for 2 hours. The reaction product which crystallises out on cooling is collected by filtration and recrystallised from ethyl acetate. The 7.1 parts of 4-(n-octadecylaminocarbonyl)-N-[3-(4-methoxybenzoylacetamido) - 4 - methoxyphenyl]phthalimide are obtained as a solid melting at 150–155° C. On analysis the compound is found to contain 71.3% of carbon, 7.9% of hydrogen and 5.6% of nitrogen ($C_{44}H_{57}N_3O_7$ requires 71.5% of carbon, 7.7% of hydrogen and 5.8% of nitrogen).

A photographic layer containing the colour coupler may be obtained in the following manner:

A mixture of 5.12 parts of colour coupler, 16 parts of n-propyl alcohol and 6.95 parts of 2 N potassium hydroxide solution is heated to the boil to dissolve and then diluted to 100 parts with distilled water. The solution so obtained is added to 400 parts of a blue sensitised gelatino silver halide emulsion containing silver halide equivalent to 10 parts of silver and 22.5 parts of gelatin. The emulsion is then coated on a paper base and the coated layer dried. When the photographic paper so obtained is exposed to blue light, developed in a colour developer containing 4-amino-N-ethyl-N-ε-hydroxypentylaniline a yellow image is obtained which has an absorption maximum of light at 434 millimicrons.

EXAMPLE 7

4-(4-dodecylphenylaminocarbonyl)-N-(4-ω-cyanacetylphenyl)phthalimide

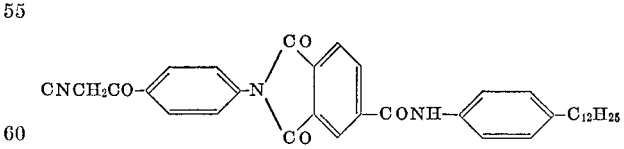

In place of the 5.25 parts of 1-phenyl-3-amino-5-pyrazolone used in Example 1 there are used 4.4 parts of 4-ω-cyanacetylaniline. The 13.9 parts of 4-(4-dodecylphenylaminocarbonyl)- N -(4-ω-cyanacetylphenyl)phthalimide are obtained as a solid melting at 222–224° C. On analysis the compound is found to contain 75.0% of carbon, 6.5% of hydrogen and 7.2% of nitrogen ($C_{36}H_{39}N_3O_4$ requires 74.9% of carbon, 6.8% of hydrogen and 7.3% of nitrogen).

A photographic layer which contains 1.35 parts of the above colour coupler, formulated by the method of Example 1 gives a magenta dye image with maximum light absorption at 500 millimicrons.

EXAMPLE 8

4-(4-dodecylphenylaminocarbonyl)-N-4-methoxy-3-[N-(1-phenyl-5-pyrazolonyl-3-)amino]phenylphthalimide

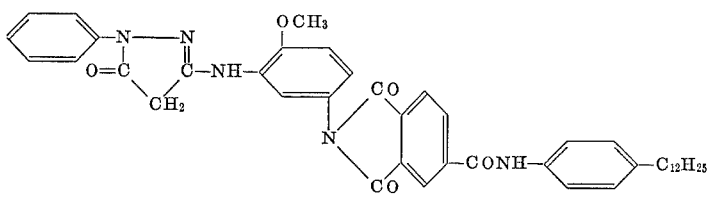

In place of 5.25 parts of 1-phenyl-3-amino-5-pyrazolone used in Example 1 there are used 8.9 parts of 1-phenyl-3-(2-methoxy-5-aminoaniline)-5-pyrazolone. The coupler is obtained as a solid melting at 214–215° C.

The preparation of 1-phenyl-3-(2-methoxy-5-aminoaniline)-5-pyrazolone used in the above example is described in Example 32 of British specification No. 956,261.

A photographic layer which contains 1.70 parts of the above coupler, formulated by the method of Example 1 gives a magenta dye image with maximum light absorption at 506 millimicrons.

EXAMPLE 9

4-(4-dodecylphenylaminocarbonyl)-N-[4-(4-methoxybenzoylacetamide)phenyl]phthalimide

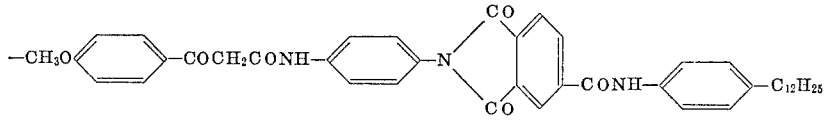

A mixture of 7.1 parts of 4-(4-methoxybenzoylacetamide)aniline, 10.9 parts of 4-(4-dodecylphenylaminocarbonyl)phthalic anhydride and 500 parts of glacial acetic acid is heated under reflux for 2 hours. After cooling the solid is filtered off and washed well with ethyl acetate. The 14 parts of 4-(4-dodecylphenylaminocarbonyl)-N-[4-methoxybenzoylacetamide)phenyl]phthalimide are obtained as a solid melting at 269–274° C. On analysis the compound is found to contain 73.7% of carbon, 6.8% of hydrogen and 5.9% of nitrogen ($C_{43}H_{47}N_3O_6$ requires 73.6% of carbon, 6.7% of hydrogen and 6.0% of nitrogen).

A photographic layer which contains 4.85 parts of the above coupler, formulated by the method of Example 6 gives a yellow dye image with maximum light absorption at 438 millimicrons.

EXAMPLE 10

4-(4-dodecylphenylaminocarbonyl)-N-3-[(4-chloro-1-hydroxy-2-naphthamide)methyl]phenyl phthalimide

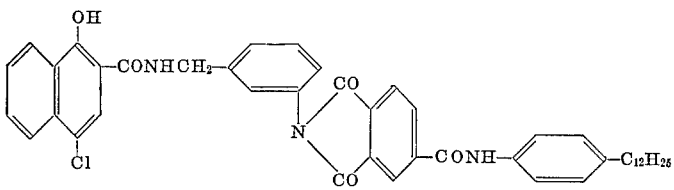

In place of the 5.25 parts of 1-phenyl-3-amino-5-pyrazolone used in Example 1 there are used 10.0 parts of 4-chloro-1-hydroxy-2-N-(3-aminobenzyl)naphthamide. The product is filtered off from the cold reaction mixture and recrystallised from ethyl acetate. The 19.2 parts of the coupler are obtained as a solid melting at 227–231° C. On analysis the compound is found to contain 72.0% of carbon, 5.7% of hydrogen and 5.3% of nitrogen ($C_{45}H_{45}N_3ClO_5$ requires 72.7% of carbon, 6.2% of hydrogen and 5.3% of nitrogen).

The 4-chloro-1-hydroxy-2-N-(3-aminobenzyl)naphthamide used in the above example may be prepared as follows:

A mixture of 20 parts of 1-hydroxy-4-chloro-2-N-(3-nitrobenzyl)naphthamide, 80 parts of ethyl alcohol and 20 parts of hydrazine hydrate is heated under reflux and Raney nickel catalyst added. After the vigorous reaction has subsided, the Raney nickel is filtered off and the filtrates evaporated to dryness in vacuo, the residue is then recrystallised from methyl alcohol containing a little sodium dithionite. The 4-chloro-1-hydroxy-2-N-(3-aminobenzyl)naphthamide is obtained as pale fawn crystals melting at 162–164° C.

The 1-hydroxy-4-chloro-2-N-(3-nitrobenzyl)naphthamide itself may be prepared as follows:

A mixture of 15.2 parts of 3-nitrobenzylamine and 29.8 parts of phenyl-1-hydroxy-4-chloro-2-naphthoate is heated at 160–170° C. at a pressure of 12 mm. and the phenol formed is distilled off. After cooling the reaction mixture is stirred with methanol, filtered and recrystallised by dissolving in 100 parts of Cellosolve and adding 90 parts of ethanol and 50 parts of water.

The 15.8 parts of 4-chloro-1-hydroxy-2-N-(3-nitrobenzyl)naphthamide are obtained as a solid melting at 192–194° C. (The word Cellosolve is a trademark.)

A photographic layer which contains 2.7 parts of the above coupler, formulated by the method of Example 3 gives a cyan dye image with maximum light absorption at 678 millimicrons.

EXAMPLE 11

2-carboxy-N-(1-phenyl-5-pyrazolonyl-3-)benzamide-4-N'-methyl-N'-(4-dodecylphenyl)sulphonamide

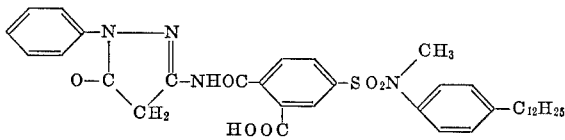

A mixture of 5.25 parts of 1-phenyl-3-amino-5-pyrazolone, 14.5 parts of phthalic anhydride-4-N-methyl-N-(4-dodecylphenyl)sulphonamide and 240 parts of glacial acetic acid is heated at 60° C. for 1 hour. The product which crystallises out of the reaction mixture on standing for 12 hours is recrystallised from 500 parts of ethanol. The 11.1 parts of 2-carboxy-N-(1-phenyl-5-pyrazolonyl-3-)benzamide-4-N'-methyl-N'-(4-dodecylphenyl)sulphonamide are obtained as a solid melting at 167–170° C. On analysis the product is found to contain 65.6% of carbon, 6.5% of hydrogen, 8.4% of nitrogen and 5.2% of sulphur ($C_{36}H_{44}N_4O_6S$ requires 65.5% of carbon, 6.7% of hydrogen, 8.5% of nitrogen and 4.85% of sulphur).

The phthalic anhydride-4-N - methyl - N - (4-dodecylphenyl)sulphonamide used in the above example may be prepared as follows:

A mixture of 36 parts of phthalic acid-4-N-methyl-N-(dodecylphenyl) sulphonamide and 400 parts of acetyl chloride is heated under reflux for 30 minutes and then evaporated to dryness in vacuo. The residue is recrystallised twice of 60–80 grade petroleum ether. The 28 parts of phthalic anhydride-4-N-methyl-N-(4-dodecylphenyl)sulphonamide are obtained as colourless solid melting at 107–108° C. On analysis the compound is found to contain 66.2% of carbon, 7.2% of hydrogen, 2.9% of nitrogen and 6.7% of sulphur ($C_{27}H_{35}NO_5S$ requires 66.8% of carbon, 7.2% of hydrogen, 2.9% of nitrogen and 6.6% of sulphur).

The phthalic acid-4-N-methyl-N - (4 - dodecylphenyl) sulphonamide may be prepared as follows:

A mixture of 39 parts of phthalic acid-4-N-(4-dodecylphenyl)sulphonamide, 12.9 parts of potassium hydroxide pellets, 380 parts of water and 32.6 parts of methyl iodide is stirred at 20° C. for 1 hour then at 50° C. for 1 hour. The mixture is acidified with 2 N hydrochloric acid solution, the colourless precipitate collected by filtration and recrystallised from 50:50 water/acetic acid mixture. The 38 parts of phthalic acid-4-N-methyl-N-(4-dodecylphenyl)sulphonamide are obtained as a colourless soild melting at 145–146° C. On analysis the compound is found to contain 64.9% of carbon, 7.0% of hydrogen, 2.8% of nitrogen and 6.6% of sulphur ($C_{27}H_{37}NO_6S$ requires 64.5% of carbon, 7.4% of hydrogen, 2.8% of nitrogen and 6.4% of sulphur).

The preparation of phthalic acid-4-N-(4-dodecylphenyl)sulphonamide is described in British patent specification No. 997,500.

A photographic layer which contains 1.57 parts of the above coupler, formulated by the method of Example 1 gives a magenta dye image with maximum light absorption at 530 millimicrons.

EXAMPLE 12

2 - carboxy - N - [3-(4-methoxybenzoylacetamido)-4-methoxphenyl]benzamide - 4 - N' - methyl - N' - (4-dodecylphenyl)sulphonamide

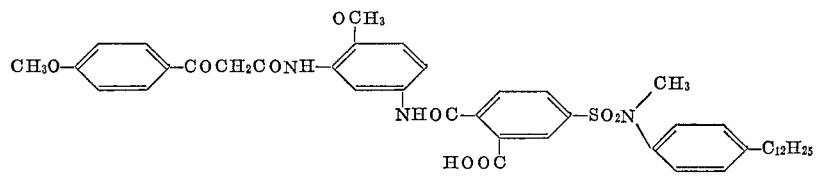

A mixture of 9.4 parts of 4-methoxy-3-(4-methoxybenzoylacetamido)aniline, 14.5 parts of phthalic anhydride-4-N-methyl-N-(4-dodecylphenyl)sulphonamide and 150 parts ethyl acetate is heated at 60° C. for 1 hour.

The solution obtained is poured into 800 parts of petroleum ether to precipitate the coupler, the product is filtered off and recrystallised from 150 parts of methyl alcohol. The 18.9 parts of 2-carboxy-N-[3-(4-methoxybenzoylacetamido) - 4 - methoxyphenyl]benzamide - 4 - N'-methyl-N'-(4-dodecylphenyl)sulphonamide are obtained as a solid melting at 124–125°. On analysis the compound is found to contain 64.5% of carbon, 6.1% of hydrogen, 5.1% of nitrogen and 4.0% of sulphur ($C_{44}H_{53}N_3SO_9$ requires 66.0% of carbon, 6.6% of hydrogen, 5.25% of nitrogen and 4.0% of sulphur).

A photographic layer which contains 5.54 parts of the above coupler, formulated by the method of Example 6 gives a yellow dye image with maximum light absorption at 438 millimicrons.

EXAMPLE 13

2-carboxy-N-[β-(1-hydroxy-2-naphthamido)ethyl]benzamide-4-N'-methyl-N'-(4-dodecylphenyl)sulphonamide

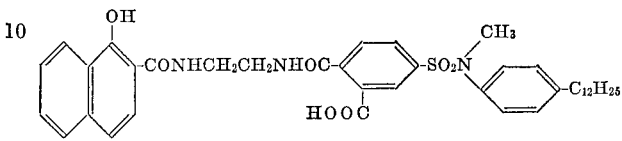

A mixture of 10.05 parts of N-(β-aminoethyl)-1-hydroxy-2-naphthamide, 16.95 parts of phthalic anhydride-4-N-methyl-N-(dodecylphenyl)sulphonamide and 250 parts of ethyl acetate is heated at 60° C. for 1 hour, the solution is then evaporated down in vacuo to a small volume. The product which crystallises out is collected by filtration and washed with methanol. The 12.5 parts of 2 - carboxy-N-[β-(1-hydroxy-2-naphthamido)ethyl]benzamide - 4 - N' - methyl - N' - (4-dodecylphenyl)sulphonamide are obtained as a solid melting at 158–160° C. On analysis the compound is found to contain 66.7% of carbon, 6.5% of hydrogen, 6.1% of nitrogen and 4.6% of sulphur ($C_{40}H_{49}N_3O_7S$ requires 67.1% of carbon, 6.8% hydrogen, 5.9% of nitrogen and 4.5% of sulphur).

EXAMPLE 14

2 - carboxy - 4 - (4-dodecylphenylaminocarbonyl) - N-{3 - [1-phenyl-5-pyrazolonyl-3-) - aminocarbonyl] - 4-chlorophenyl}benzimide

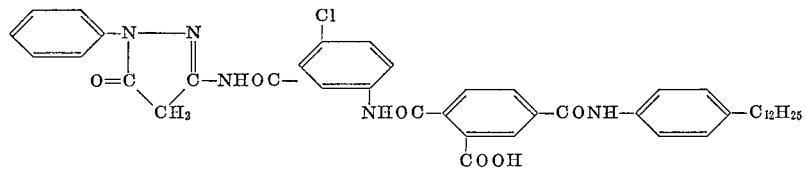

A mixture of 3.28 parts of 1-phenyl-3-(3-amino-4-chloro)benzoylamine-5-pyrazolone, 4.35 parts of 4-(4-dodecylphenylaminocarbonyl)phthalic anhydride and 75 parts of ethyl acetate is heated under reflux for 2 hours. The product which crystallises out on cooling is collected by filtration and extracted twice with methanol. The 4.6 parts of 2-carboxy-4-(4-dodecylphenylaminocarbonyl)-N-{3-[1-phenyl-5-pyrazolonyl-3-)aminocarbonyl] - 4 - chlorophenyl}benzamide are obtained as a solid melting at 236° C. On analysis the compound is found to contain 67.3% of carbon, 7.3% of hydrogen, 9.5% of nitrogen and 5.0% of chlorine ($C_{43}H_{36}N_5O_6Cl$ requires 67.6% of carbon, 6.0% of hydrogen, 9.2% of nitrogen and 4.7% of chlorine).

The 1-phenyl - 3 - (3-amino-4-chloro)benzoylamine-5-pyrazolone used in the above example may be prepared as follows:

40 parts of 1-phenyl-3-(3-nitro-4-chloro)benzoylamino-5-pyrazolone are dissolved in 500 parts of ethyl acetate and reduced with hydrogen at 60° C. over Raney nickel catalyst. The product is filtered off, dissolved in n-propyl alcohol by warming and filtered to separate the catalyst. The solution is then evaporated in vacuo to a small volume and the product which crystallises out is collected by filtration. The 23.7 parts of 1-phenyl-3-(3-amino-4-chloro) benzoylamino-5-pyrazolone are obtained as a solid melting at 210–211° C. On analysis the compound is found to contain 58.6% of carbon, 4.2% of hydrogen, 16.5% of nitrogen and 11.0% of chlorine ($C_{16}H_{13}N_4O_2Cl$ requires 58.4% of carbon, 4.0% of hydrogen, 17.0% of nitrogen and 10.8% of chlorine).

The 1-phenyl-3-(3-nitro-4-chloro)benzoylamino-5-pyrazolone itself may be prepared as follows:

A mixture of 13.4 parts of 5-nitro-2-chlorobenzoyl chloride, 10 parts of 1-phenyl-3-amino-5-pyrazolone and 10 parts of diethyl oxalate is heated on a steam bath for 10 minutes, 50 parts of ethyl alcohol are then added to the solidified mixture and the heating continued for a further 30 minutes. The product is collected by filtration and extracted twice with methyl alcohol. The 13 parts of 1-phenyl-3-(3-nitro-4-chloro) benzoylamino - 5 - pyrazolone are obtained as a solid melting at 210–215° C.

The 5-nitro-2-chlorobenzoyl chloride may be obtained by heating 5-nitro-2-chlorobenzoic acid with thionyl chloride.

EXAMPLE 15

3-carboxy-4-[4-β-(1-hydroxy-2-naphthamido)ethyl phenyl]aminocarbonyl-N-(4-dodecylphenyl)benzamide

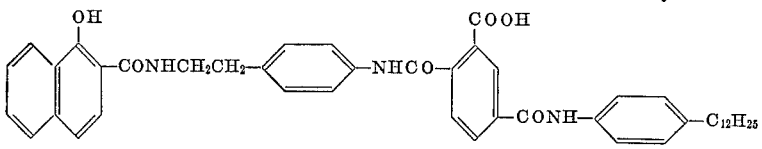

8.7 parts of 4-(4-dodecylphenyvlaminocarbonyl)-phthalic anhydride and 6.1 parts of 4-(p-amino-β-phenylethyl)-1-hydroxynaphthamide as described in U.S. Pat. 2,589,004 are heated under reflux with 100 parts by volume of dry ethyl acetate for 15–30 minutes. Complete solution is not achieved. On cooling and filtering off the solid and washing with a little ethyl acetate, 14.6 parts of 3-carboxy-4-[4-β-(1-hydroxy-21-naphthamide ethyl phenyl)aminocarbonyl-N-(4-dodecyclphenyl)benzabide are obtained, M.P. 266° dec. On analysis, this compound is found to contain 73.7% of carbon, 6.7% of hydrogen and 6.0% of nitrogen ($C_{46}H_{51}N_3O_6$ requires 74.5% of carbon, 6.9% of hydrogen and 5.7% of nitrogen).

A photographic emulsion layer which contains 2.67 parts of the above colour coupler, formulated by the method of Example 3 gives a cyan dye image with a light absorption maximum at 684 millimicrons.

EXAMPLE 16

3-carboxy - 4 - [2β-(1-hydroxy - 2 - naphthamido)-ethyl phenyl]aminocarbonyl-N-(4-dodecylphenyl)benzamide

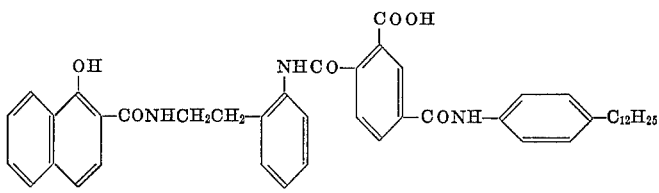

8.7 parts of 4-(4-dodecylphenylaminocarbonyl)phthalic anhydride and 6.1 parts of 2-(o-amino-β-phenylethyl)-1-hydroxynaphthamide as described in U.S. Pat. 3,002,836 are heated under reflux with 100 parts by volume of dry ethyl acetate for 15–30 minutes. Complete solution is not achieved. On cooling and filtering off the solid and washing with a little ethyl acetate, 13.0 parts of 3-carboxy - 4 - [2-β-(1-hydroxy-2-naphthamide)ethyl phenyl] aminocarbonyl - N-(4-dodecylphenyl)benzamide are obtained as a colourless powder M.P. 190° dec. On analysis, this compound is found to contain 75.0% of carbon, 7.0% of hydrogen and 5.5% of nitrogen ($C_{46}H_{51}N_3O_6$ requires 74.5% of carbon, 6.9% of hydrogen and 5.7% of nitrogen).

A photographic emulsion layer which contains 2.67 parts of the above colour coupler, formulated by the method Example 3 gives a cyan dye image with a light absorption maximum at 6.90 millimicrons.

EXAMPLE 17

3-carboxy-4-[6-(1-hydroxy-2-naphthamido)hexyl] aminocarbonyl-N-(4-dodecylphenyl)benzamide

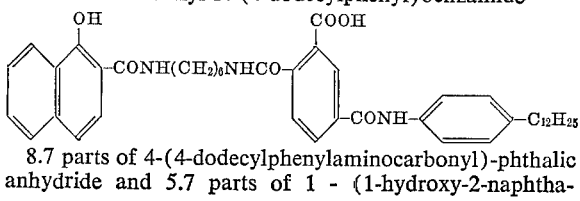

8.7 parts of 4-(4-dodecylphenylaminocarbonyl)-phthalic anhydride and 5.7 parts of 1 - (1-hydroxy-2-naphthamido)-6-aminohexane are heated under reflux with 100 parts by volume of dry ethyl acetate for 15–30 minutes. On cooling and filtering off the solid deposited 12.4 parts of 3-carboxy-4 - [6-(1-hydroxy - 2-naphthamido)hexyl] aminocarbonyl-N-(4-dodecylphenyl)benzamide are obtained M.P. 182° dec. On analysis, this compound is found to contain 7.4% of hydrogen and 5.8% of nitrogen ($C_{44}H_{55}N_3O_6$ requires 7.6% of hydrogen and 5.8% of nitrogen).

A photographic emulsion layer which contains 2.60 parts of the above colour coupler, formulated by the method of Example 3 gives a cyan dye image with a light absorption maximum at 680 millimicrons.

EXAMPLE 18

3-carboxy-4-[2β-(1-hydroxy - 4 - chloro-2-naphthamido)-ethyl phenyl]aminocarbonyl - N - (4-dodecylphenyl)-benzamide

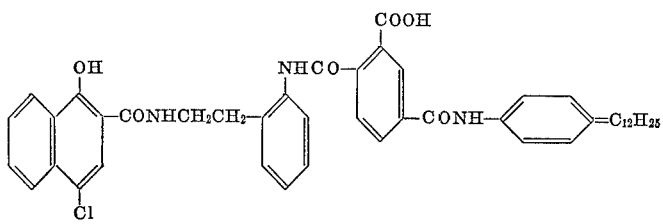

5.9 parts of 4-(4-dodecylphenylaminocarbonyl)phthalic anhydride and 4.5 parts of 2-(o-amino-β-phenylethyl)-1-hydroxy-4-chloronaphthamide are heated under reflux with 100 parts by volume of dry ethyl acetate for 20 minutes. Complete solution is not achieved. On cooling and filtering off the solid and washing with a little ethyl acetate, 9.0 parts of 3-carboxy - 4-[2-β - (1-hydroxy-4-chloro-2-naphthamide)ethyl phenyl]aminocarbonyl-N-(4-dodecylphenyl)-benzamide are obtained M.P. 198–9° dec. On analysis, this compound is found to contain 71.2% of carbon, 6.4% of hydrogen, 5.4% of nitrogen and 4.4% of chlorine ($C_{47}H_{50}ClN_3O_6$ requires 71.1% of carbon, 6.4% of hydrogen, 5.4% of nitrogen and 4.6% of chlorine).

A photographic emulsion layer which contains 2.80 parts of the above colour coupler, formulated by the method of Example 3 gives a cyan dye image with light absorption maximum at 690 millimicrons.

EXAMPLE 19

4-(4-dodecylphenylaminocarbonyl) - N - (3-[1-(2:4:6-trichlorophenyl) - 5 - pyrazolonyl - 3 - ]aminocarbonylphenyl)phthalimide

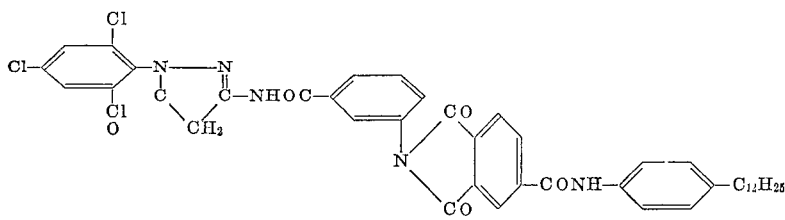

A mixture of 6.6 parts of 1(2:4:6-trichlorophenyl)-3-(3-aminobenzoylamino)-5-pyrazolone, 7.25 parts of 4-(4-dodecylphenylaminocarbonyl)phthalic anhydride and 150 parts of glacial acetic acid is heated under reflux for 2 hours. After cooling the precipitate is collected by filtration and recrystallized from 200 parts of n-propanol. The 9.5 parts of 4-(4-dodecylphenylaminocarbonyl)-N-{3-[1-(2:4:6 - trichlorophenyl)-5-pyrazolonyl-3-]-aminocarbonylphenyl}phthalimide are obtained as a yellow solid melting at 205–206° C. On analysis the compound is found to contain 63.5% of carbon, 5.3% of hydrogen, 8.5% of nitrogen and 12.7% of chlorine. ($C_{43}H_{42}N_5Cl_3O_5$ requires 63.4% of carbon, 5.2% of hydrogen, 8.6% of nitrogen and 13.1% of chlorine).

EXAMPLE 20

4-(4-dodecylphenylaminocarbonyl) - N-{4-[1-(2:4:6-trichlorophenyl-5-pyrazolonyl - 3 - ]aminecarbonylphenyl}-phthalimide

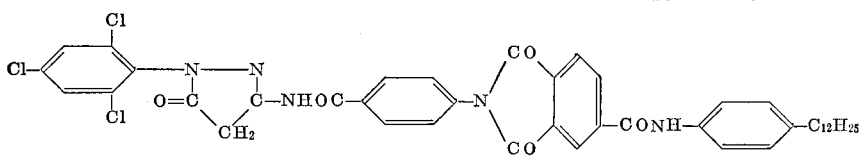

In place of the 6.6 parts of 1-(2:4:6-trichlorophenyl)-3-(3-aminobenzoylamino)-5-pyrazolone used in Example 20 there are used 6.6 parts of 1-(2:4:6-trichlorophenyl)-3-(4-aminobenzoylamino)-5-pyrazolone. The coupler is filtered from the reaction mixture washed with ethyl acetate and dried. The 9.8 parts of 4-(4-dodecylphenylaminocarbonyl)-N-{4-[1 - (2:4:6 - trichlorophenyl)-5-pyrazolonyl-3-]aminocarbonylphenyl}phthalimide are obtained as a solid melting at 252–254° C.

EXAMPLE 21

4-(4-dodecylphenylaminocarbonyl) - N - {3-[1-phenyl-5-pyrazolonyl-3-]aminocarbonylphenyl}phthalimide

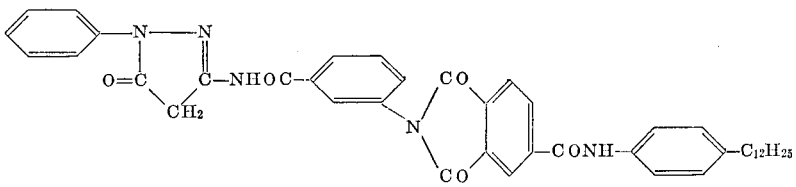

A mixture of 5.9 parts of 1-phenyl-3-(3-aminobenzoylamino)-5-pyrazolone, 8.72 parts of 4-(4-dodecylphenylaminocarbonyl)phthalic anhydride and 100 parts of glacial acetic acid is stirred under reflux for 2 hours. After cooling the product is collected by filtration, boiled with 500 parts glacial acetic acid, cooled and filtered. The 10.1 parts of 4-(4 dodecylphenylaminocarbonyl)-N-{3-[1-phenyl - 5 - pyrazolonyl - 3 - ]aminocarbonylphenyl} phthalimide is obtained as a yellow solid melting at 270–272° C. On analysis the compound is found to contain 72.2% of carbon, 6.4% of hydrogen and 9.5% of nitrogen. ($C_{43}H_{45}N_5O_5$ requires 72.5% of carbon, 6.3% of hydrogen and 9.8% of nitrogen).

1.23 parts of the colour coupler was dissolved by bringing it to the boil in 5 parts of redistilled n-propanol and 1.75 parts of 2 N potassium hydroxide solution. The solution was diluted by 20 parts of distilled water. The dilute solution so obtained was added to 65 parts of a green sensitised gelatino silver halide emulsion containing silver halide equivalent to 0.95 part of silver and 3.5% of gelatin. The emulsion was then coated on to film base and the coated layer dried. The photographic layer so obtained was exposed to green light, processed by a conventional reversal process for materials containing substantive colour couplers including development in a colour developer containing 4-amine-N-ethyl-N-ξ-hydroxy ethyl aniline to yield a magenta image which had an absorption maximum at a wavelength of light 544 mμ.

I claim as my invention:

1. 4-(4-dodecylphenylaminocarbonyl)-N-{3-[1-phenyl-5-pyrazolonyl-3-]aminocarbonylphenyl}phthalimide.

References Cited

UNITED STATES PATENTS

| | | | |
|---|---|---|---|
| 2,506,654 | 5/1950 | Stein et al. | 260—310 |
| 3,161,512 | 12/1964 | Greenhalgh | 96—100 |
| 3,278,306 | 10/1966 | Greenhalgh | 96—100 |
| 3,328,419 | 6/1967 | Anderson | 260—310 |

NATALIE TROUSOF, Primary Examiner

U.S. Cl. X.R.

260—326, 346.3, 465, 473, 518, 519, 559